United States Patent [19]

Fosteris

[11] 4,121,765

[45] Oct. 24, 1978

[54] ICE MAT

[76] Inventor: Stelian Fosteris, 40-35 Ithaca St. 4B, Elmhurst, N.Y. 11373

[21] Appl. No.: 721,539

[22] Filed: Sep. 8, 1976

[51] Int. Cl.² ............................................. E01B 23/00
[52] U.S. Cl. .................................................... 238/14
[58] Field of Search ................. 238/14; 152/171, 172, 152/208

[56] References Cited

U.S. PATENT DOCUMENTS

| 1,142,727 | 6/1915 | Pottsgrove | 238/14 |
| 1,412,048 | 4/1922 | Ehringer | 238/14 |
| 1,606,622 | 11/1926 | Fogarty | 238/14 |
| 3,202,358 | 8/1965 | Griswold | 238/14 |
| 3,350,013 | 10/1967 | Bergquist | 238/14 |
| 3,425,624 | 2/1969 | Jacobs | 238/14 |
| 3,640,459 | 2/1972 | Preisier | 238/14 |
| 3,701,474 | 10/1972 | Welz | 238/14 |
| 3,997,110 | 12/1976 | Aumont | 238/14 |

*Primary Examiner*—Randolph A. Reese
*Attorney, Agent, or Firm*—Robert D. Farkas

[57] ABSTRACT

An ice mat device for improving the traction of a wheel of an automobile on ice includes an elongated, flexible mat member of a rectangular shape, wherein a pair of elongated strap members are longitudinally embedded in the mat. A plurality of elongated rib members are affixed to the upper surface of the mat. A plurality of elongated ice gripping elements are affixed to a lower surface of the mat, wherein the gripping elements are designed to be embedded into the ice on the ground.

5 Claims, 5 Drawing Figures

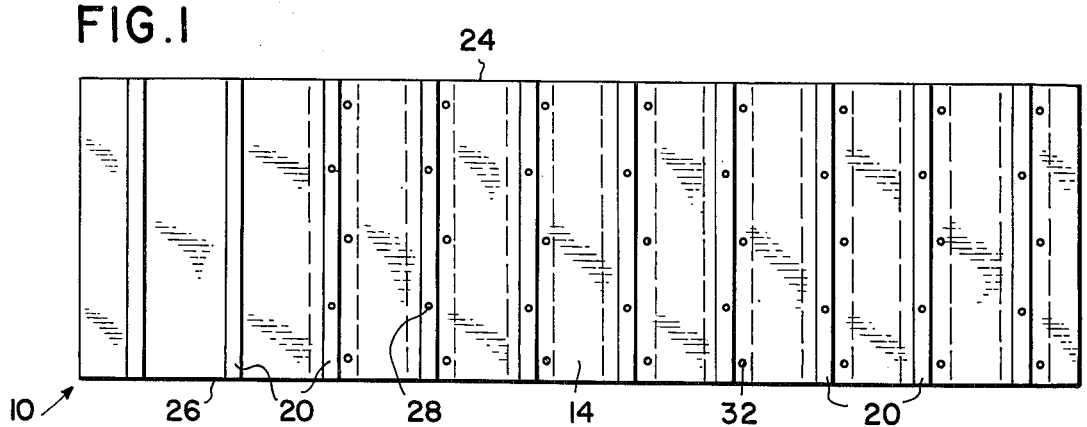
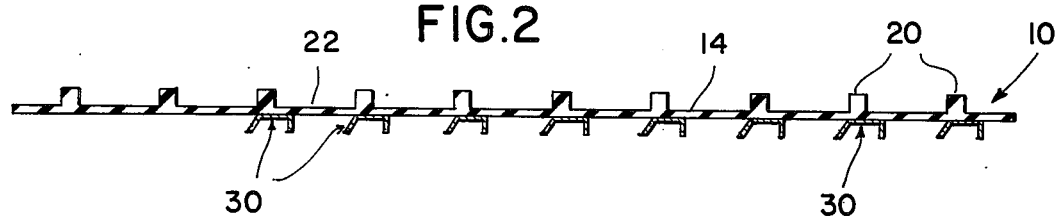
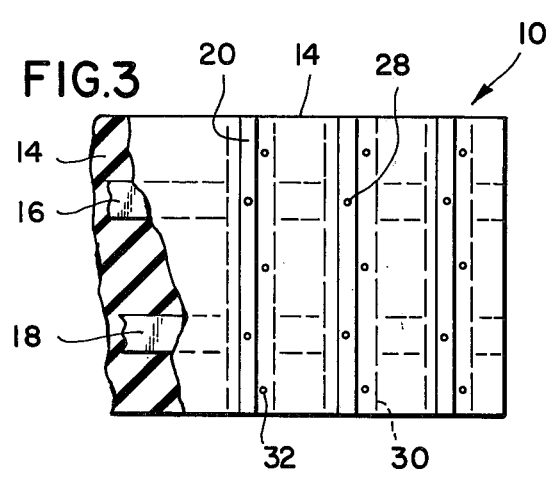
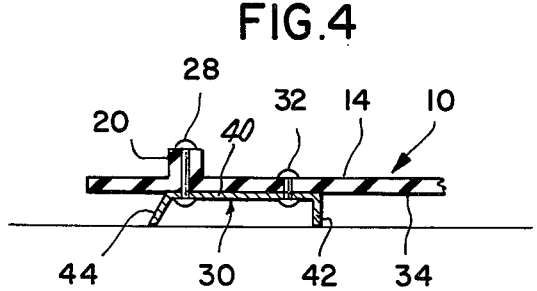
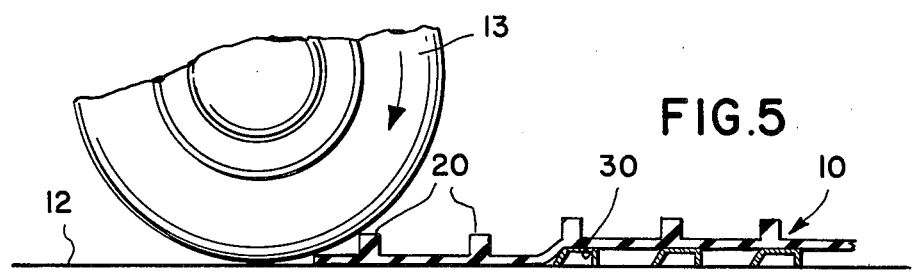

ICE MAT

BACKGROUND OF THE INVENTION

A number of U.S. patents are related to variously designed ice mats for improving the traction of a wheel to an ice covered ground, but these patents are non-applicable to my present invention. These patents are: U.S. Pat. Nos. 2,422,006 to Friedman; 2,486,911 to Becker; 2,975,977 to Chodacki and 3,291,393 to May.

SUMMARY OF THE INVENTION

My present invention relates to a unique and novel ice mat for the improvement of traction of a wheel of an automobile on ice.

An object of my present invention is to provide a new improved ice mat for obtaining improved traction between the wheels of an automobile and an ice covered ground.

A further object of my present invention is to provide ice gripping elements affixed to a lower surface of the mat, wherein a forward movement of the wheel causes the ice gripping element to be embedded into the ice.

Briefly, my present invention comprises an elongated, flexible mat member of a rectangular shape, wherein a pair of elongated steel strap members are longitudinally embedded in the mat. A plurality of elongated rib members are affixed to the upper surface of the mat. A plurality of elongated ice gripping elements are affixed to a lower surface of the mat, wherein the gripping elements are designed to be embedded into ice on the ground.

BRIEF DESCRIPTION OF THE DRAWING

The objects and features of the invention may be understood with reference to the following detailed description of an illustrative embodiment of the invention, taken together with the accompanying drawings in which:

FIG. 1 illustrates a top view of an ice mat;

FIG. 2 illustrates a side view of the ice mat;

FIG. 3 illustrates a top partial cutaway view of a portion of the ice mat;

FIG. 4 illustrates a side cross-sectional view of the ice mat; and

FIG. 5 illustrates a side view of a wheel of an automobile engaging the ice mat.

DETAILED DESCRIPTION OF THE PREFERRED EMBODIMENT

Turning now descriptively to the drawings, in which similar reference characters denote similar elements throughout the several views, FIGS. 1–3 show an ice mat device 10 adapted to be placed on ice 12 on the ground and under the rear wheel 13 of the car as shown in FIG. 5. The device 10 generally comprises an elongated flexible rubber mat 14 of a generally rectangular shape. A pair of elongated metallic straps 16, 18 are longitudinally embedded within the rubber mat 14. A plurality of elongated rubber rib members 20 are transversely aligned across the upper surface 22 of the mat 14, wherein the rib members 20 are spaced from one side 24 to the other side 26 of the mat 14. Each rib member 20 is secured to the mat 14 by a plurality of rivet members 28 extending downwardly through the rib member 20 and the mat 14. A plurality of ice gripping elements 30 are secured by rivet means 32 to the lower surface 34 of the mat 14, wherein each gripping element 30 extends from one side 24 to the other side 26 of the mat 14. Each gripping element 30 comprises a flat center portion 40 abutted against the lower surface 34 of the mat 14. A first flange element 42 extends perpendicularly downwardly from the rear edge of portion 40. A second flange element 44 is affixed at an obtuse angle to the forward edge of portion 40, wherein element 44 extends downwardly and forwardly from portion 40. The lower edges of elements 42, 44 are embedded into the ice 12 as the car wheel 14 rolls backwardly over the rib members 20, when the mat device 10 is positioned just rearwardly of the wheel 14, relative to the normal direction of forward travel of the car.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An ice mat, which comprises;
   a. an elongated flexible mat member of a rectangular shape having a pair of sides and a pair of ends, said flexible mat member fabricated from a rubber-like material;
   b. a pair of elongated flexible strap members, each strap member longitudinally embedded in said mat, said pair of elongated strap members being disposed in spaced apart parallel relationship parallel to said pair of sides;
   c. a plurality of elongated rib members, said elongated rib members fabricated from a rubber-like material;
   d. means for mounting each said rib member transversely across an upper surface of said mat, said rib member extending between said pair of sides;
   e. a plurality of elongated ice gripping elements, said plurality of elongated ice gripping elements being less in number than the number of said elongated rib members; and
   f. means for securing each said gripping element transversely across a lower surface of said mat, wherein said each gripping element is disposed beneath a sub-plurality of said elongated rib members and parallel thereto, the remaining quantity of said plurality of elongated rib members being disposed adjacent one of said pair of ends of said flexible mat member, wherein each of said ice gripping elements includes an elongated flat center portion having a forward and a rear edge, said each ice gripping element including a first flange element affixed perpendicularly to said rear edge of said center portion and extending downwardly therefrom, said each ice gripping element including a second flange element affixed at an obtuse angle to said forward edge of said center portion and extending forwardly and downwardly therefrom, said second flange element being disposed intermediate said first flange element and said one of said pair of ends of said flexible mat member.

2. A device according to claim 1, wherein said mounting means is a plurality of rivet members.

3. A device according to claim 2 wherein each of said plurality of rivet members pass through openings in said elongated rib members and said elongated flexible mat member and said elongated flat center portion of said ice gripping element.

4. A device according to claim 1, wherein said securing means is a plurality of rivet means.

5. A device according to claim 4 wherein each of said plurality of rivet means pass through openings in said elongated flexible mat member and said elongated flat center portion of said ice gripping element.

* * * * *